United States Patent [19]
Mukai

[11] Patent Number: 5,870,997
[45] Date of Patent: Feb. 16, 1999

[54] EVAPORATIVE FUEL CONTROLLER FOR INTERNAL COMBUSTION ENGINE

[75] Inventor: Takeshi Mukai, Shizuoka-ken, Japan

[73] Assignee: Suzuki Motor Corporation, Shizuoka-ken, Japan

[21] Appl. No.: 986,242

[22] Filed: Dec. 5, 1997

[30] Foreign Application Priority Data

Dec. 27, 1996 [JP] Japan ................................ 8-357792

[51] Int. Cl.$^6$ .................................................. F02M 33/00
[52] U.S. Cl. ......................... 123/520; 123/516; 137/574
[58] Field of Search .................................. 123/520, 516, 123/518, 519, 521; 137/587, 588, 110, 574, 576, 565; 220/86.1, 86.2

[56] References Cited

U.S. PATENT DOCUMENTS

| | | |
|---|---|---|
| 5,269,279 | 12/1993 | Mukai et al. . |
| 5,273,018 | 12/1993 | Suzuki . |
| 5,297,527 | 3/1994 | Suzuki et al. . |
| 5,297,528 | 3/1994 | Mukai . |
| 5,335,638 | 8/1994 | Mukai . |
| 5,375,579 | 12/1994 | Mukai . |
| 5,435,587 | 7/1995 | Mukai . |
| 5,460,143 | 10/1995 | Narita . |
| 5,546,913 | 8/1996 | Aoki . |
| 5,579,742 | 12/1996 | Yamazaki ................................ 123/520 |
| 5,606,954 | 3/1997 | Yamazaki ................................ 123/520 |
| 5,647,333 | 7/1997 | Mukai ..................................... 123/520 |
| 5,647,334 | 7/1997 | Miller ..................................... 123/520 |
| 5,653,211 | 8/1997 | Ishikawa ................................ 123/520 |
| 5,669,361 | 9/1997 | Weissinger ............................. 123/520 |
| 5,671,718 | 9/1997 | Curran ................................... 123/520 |

*Primary Examiner*—Carl S. Miller
*Attorney, Agent, or Firm*—Flynn, Thiel, Boutell & Tanis, P.C.

[57] ABSTRACT

An evaporative fuel controller for an internal combustion engine having a check valve disposed along a communication passage for closing a refueling vapor control valve during deactivation and activation of the engine except during the supply of fuel to a fuel tank. This eliminates a likelihood of fuel and/or evaporated fuel in the fuel tank flowing into the canister. The result is that the canister can be prevented from being impaired which would otherwise be caused by the aforesaid fuel and/or evaporated fuel, whereby the canister performance can be insured. The evaporative fuel controller has a refueling vapor control valve disposed in the fuel tank. The control valve includes first and second chambers in which the first chamber is partitioned and defined by a diaphragm so as to be communicated to a fuel-feeding pipe in the fuel tank adjacent to the fueling end of the fuel-feeding pipe. The second chamber is partitioned and defined by the diaphragm so as to be communicated to both of the canister and the fuel tank. A communication passage communicates between the first chamber and the canister. A check valve is positioned along the communication passage.

4 Claims, 8 Drawing Sheets

FIG. 8
PRIOR ART
BEFORE FUEL SUPPLY

FIG. 9
PRIOR ART
DURING FUEL SUPPLY

FIG.10
PRIOR ART
AFTER FUEL SUPPLY

FIG.11
PRIOR ART
DURING ENGIN OPERATION

FIG.12
PRIOR ART $P_2 > P_1$  $P_2 \fallingdotseq P_1 + h_1$ (mmHg)

FIG.13
PRIOR ART $P_2' > P_1'$  $P_2' \fallingdotseq P_1' + h_2'$ (mmHg)

EVAPORATIVE FUEL CONTROLLER FOR INTERNAL COMBUSTION ENGINE

FIELD OF THE INVENTION

This invention relates to an evaporative fuel controller for an internal combustion engine. More particularly, it relates to an improved evaporative fuel controller for an internal combustion engine having a check valve disposed along a communication passage for closing a refueling vapor control valve during deactivation and activation of the engine except during the supply of fuel to a fuel tank. The communication passage communicates between a first chamber of the refueling vapor control valve and a canister, whereby there is eliminated a likelihood of fuel and/or evaporated fuel in the fuel tank flowing into the canister, with the result being that the canister can be prevented from being impaired by the aforesaid fuel and/or evaporated fuel, and canister performance can be insured.

BACKGROUND OF THE INVENTION

In vehicles, evaporative fuel which leaks into the ambient air from a fuel tank, etc., is described as one of the causes of air pollution because of the large content of hydrocarbons (HC). The evaporative fuel also contributes to fuel loss. Accordingly, various techniques are known as a prevention thereagainst, and an evaporative fuel controller (an evaporation system) is representative of one such technique. In this controller, evaporated fuel from the fuel tank is absorbed by a canister which contains an absorbent such as activated carbon. The absorbed fuel is released (purged) from the canister during operation of an engine, and is then supplied to the engine.

The above-described controller is disclosed, e.g., in published Japanese Patent Application Laid-Open No. 7-279788. A controller disclosed in this publication includes the following: a shutter disposed on the top of a filler tube, the shutter being opened by the insertion of a fuel-feeding nozzle therein; a vent tube for communicating between an upper space in a fuel tank body and a canister; a fuel supercharge-preventing valve positioned at the end of the vent tube extending over inside the fuel tank body; a vent cut valve provided substantially midway along a line of the vent tube for closing the line of the vent tube in response to opening and closing movement of the shutter; and, a clearance provided on a side wall of the filler tube for communicating a space in the vent tube between the fuel supercharge-preventing valve and the vent cut valve with an upper space in the filler tube. The evaporated fuel controller thereby prevents stoic of the fuel supercharge-preventing valve without increases in dimensions and weight of the same valve, and further prevents a rise in liquid level in the filler tube when temperature inside the fuel tank body rises.

Figure 7:
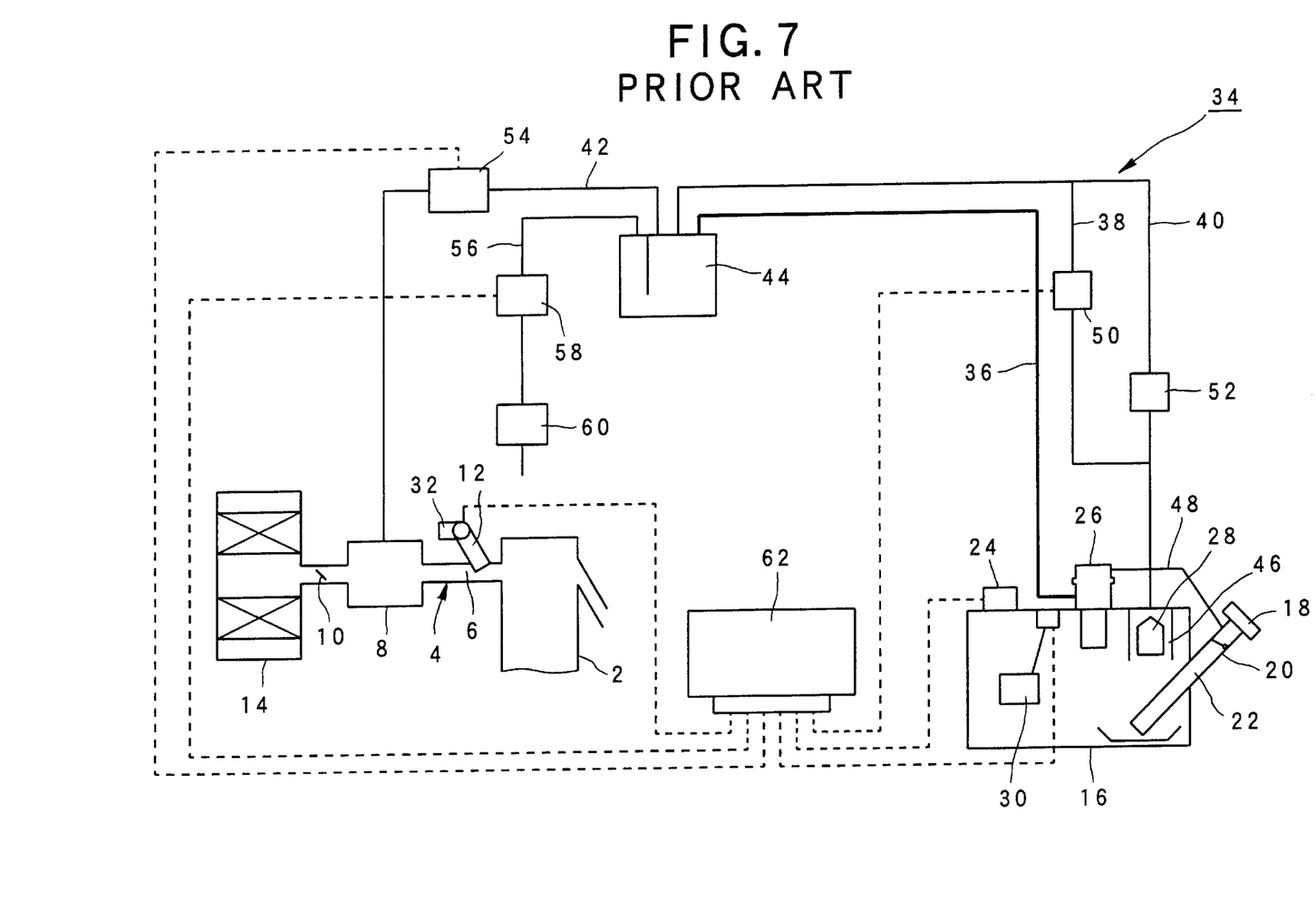
FIG. 7 is a diagrammatic view illustrating an evaporative fuel controller for an internal combustion engine according to the prior art.

Referring to FIG. 7, a conventional evaporative fuel controller is illustrated, in which reference numeral 2 denotes an internal combustion engine disposed in a vehicle (not shown); 4 an intake manifold; 6 an intake passage; 8 a surge tank; 10 a throttle valve; 12 a fuel injection valve; 14 an air cleaner; and, 16 a fuel tank.

The fuel tank 16 has a fuel-feeding pipe (filler hose) 20 incorporated therein. A fuel-feeding cap 18 is positioned on the pipe 20. The pipe 20 has a fuel-feeding passage (filler passage) 22 formed therethrough.

The fuel tank 16 has the following provided therein: a fuel pump (not shown); a tank pressure sensor 24; a refueling vapor control valve 26 and a float valve 28, the control valve 26 including a float valve body (not shown) which is moved upward and downward, depending upon fuel quantity; and, a level gauge 30 for detecting the fuel quantity. The refueling vapor control valve 26 is positioned at a substantially central portion of the tank 16. The float valve 28, which is smaller in dimension than the control valve 26, is located at a position spaced apart from a central portion of the tank 16. The fuel pump is communicated to one end of a fuel supply passage (not shown). The other end of the fuel supply passage is communicated to the fuel injection valve 12. The fuel injection valve 12 has a fuel pressure regulator 32 arranged in series therewith. The fuel pressure regulator 32 is communicated to one end of a fuel return passage (not shown). The other end of the fuel return passage is positioned and opened in the fuel tank 16.

A positive pressure type of evaporative fuel controller (evaporation system) 34 is provided between the fuel tank 16 and an intake system of the engine 2. In the evaporative fuel controller 34, one end of each of first to third evaporation passages 36, 38, and 40 communicates with the inside of the fuel tank 16, while one end of a purge passage 42 communicates with the surge tank 8 which constitutes the intake passage 6. Further, a canister 44 is located between the other end of each of the evaporation passages 36, 38, 40 and the other end of the purge passage 42.

More specifically, one end of the first evaporation passage 36 is provided in communication with the refueling vapor control valve 26 in the fuel tank 16. One end of the second evaporation passage 38 communicates with the third evaporation passage 40 at a location substantially midway therealong. And, one end of the third evaporation passage 40 is positioned inside a float guide body 46 at a location spaced apart from the top of the tank 16 by a predetermined distance so as to be opened and closed by the float valve 28. In the fuel tank 16, the float valve 28 is guided and moved upward/downward inside the float guide body 46. In the fuel tank 16, there exists a gap between the ends of the first and third evaporation passages 36 and 40.

The other end of the first evaporation passage 36 is communicated to the top of the canister 44. The other end of the second evaporation passage 38 communicates with the third evaporation passage 40 at a location substantially midway therealong. The other end of the third evaporation passage 40 is communicated with the top of the canister 44.

The refueling vapor control valve 26 is provided with a float valve body 26G (FIG. 8); and, first and second chambers in which the first chamber 26B is a pressure-working chamber while the second chamber 26C is a passage communication chamber. The first and second chambers are defined and partitioned by a partition body 26D, or a diaphragm, within a housing 26E. In addition, the first chamber has a spring 26F provided therein for pressing the diaphragm. Further, a valve seat body is provided for causing the first evaporation passage 36 to be opened and closed by a central portion of the diaphragm being brought into contact with and movement away from the valve seat body in the second chamber. The first chamber and the fuel-feeding passage 22 are communicated to one another through a tank-side communication passage 48.

A solenoid valve 50 is disposed along the second evaporation passage 38. The valve 50 is formed by a conventional two-way electromagnetic valve.

The third evaporation passage 40 is provided with an internal tank pressure control valve, or rather a pressure control valve 52. The pressure control valve 52 provides an opening action so as to open the third evaporation passage 40 when the internal pressure of the fuel tank 16 exceeds a predetermined pressure during stopping of the engine 2. The pressure control valve 52 is formed by a check valve. The check valve includes a partition body and a check body within a housing (not shown). The check body is provided on the partition body.

The other end of the second evaporation passage 38 communicates with the third evaporation passage 40 at a location toward the canister 44, i.e., between the canister 44 and the pressure control valve 52, whereby the other end of the second passage 38 bypasses the pressure control valve 52. In addition, the aforesaid predetermined pressure is a pressure value at which the pressure control valve 52 is caused to provide a closing action, even when the fuel tank 16 is being supplied with fuel.

A purge valve (solenoid valve) 54 is disposed along the purge passage 42 for controlling an amount of evaporated fuel in accordance with an operating state of the engine 2. The evaporated fuel is to be fed into the intake passage 6.

The other end of the first to third evaporation passages 36, 38, 40 and the other end of the purge passage 42 are arranged in a side-by-side array and opened within the top of the canister 44. The canister 44 is communicated to one end of an atmosphere communication passage 56. The atmosphere communication passage 56 has the following positioned toward the other end thereof: an air-cut valve (solenoid valve) 58 for opening and closing the atmosphere communication passage 56; and, an air cleaner 60.

The canister 44 absorbs and retains evaporated fuel which is generated in the fuel tank 16 and is then introduced into the evaporation passages 36, 38, and 40. The absorbingly retained fuel is liberated from the canister 44 by the ambient air introduced through the atmosphere communication passage 56 during operation of the engine 2. The liberated fuel is then supplied to the intake passage 6 through the purge passage 42.

The fuel injection valve 12, the solenoid valve 50, the purge valve 54, and the air-cut valve 58 all communicate with the control means 62.

Figure 8:
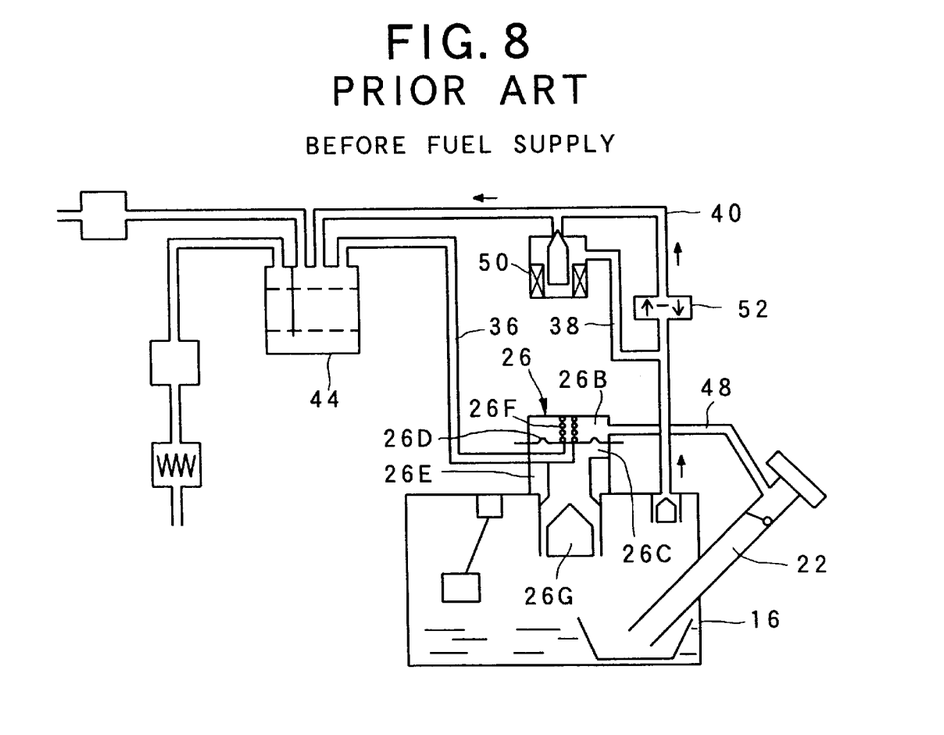
FIG. 8 is a schematic view of the prior art of FIG. 7 and showing a fuel tank before fuel supply thereto.

As illustrated in FIG. 8, the refueling vapor control valve 26 and the solenoid valve 50 are closed before fuel supply to the fuel tank 16. In addition, the pressure control valve 52 retains the internal tank pressure of the fuel tank 16. When the internal tank pressure is greater than a predetermined pressure, then the pressure control valve 52 is operated to open the third evaporation passage 40. Then, the evaporated fuel generated in the tank 16 is absorbed by the canister 44 through the third evaporation passage 40.

Figure 9:
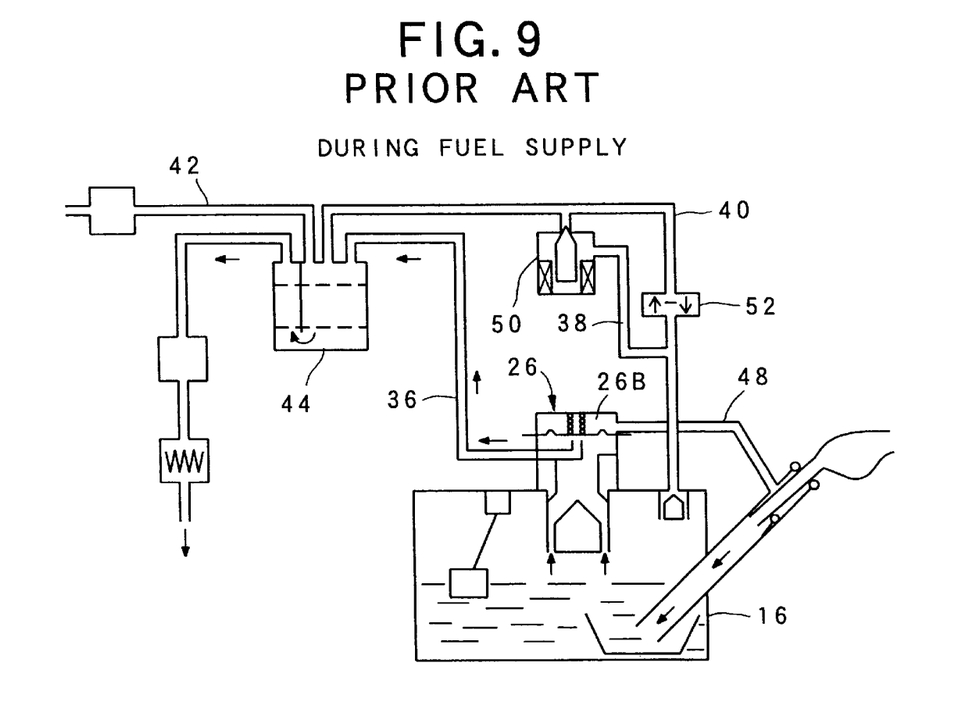
FIG. 9 is a schematic view of the prior art of FIG. 7 and showing the fuel tank during the fuel supply thereto.

As illustrated in FIG. 9, a negative pressure is established in the first chamber 26B of the refueling vapor control valve 26 during the feeding of fuel into the tank 16, and then the refueling vapor control valve 26 is opened. Thus, the evaporated fuel in the fuel tank 16 is absorbed by the canister 44 through the first evaporation passage 36.

Then, the evaporated fuel absorbed by the canister 44 is purged into the intake passage 6 through the purge passage 42 in accordance with an operating state of the engine 2.

Figure 10:
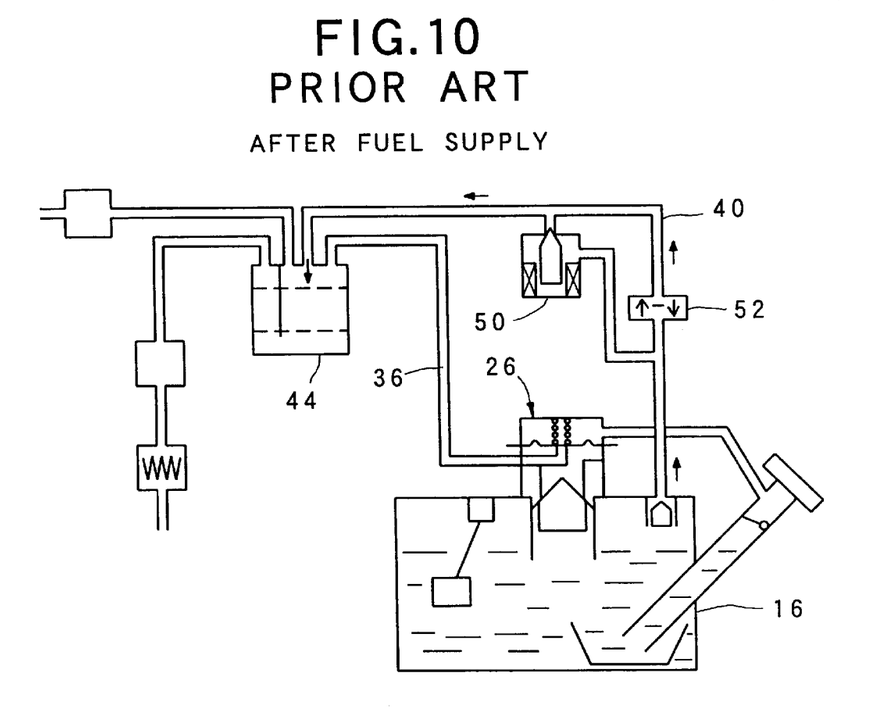
FIG. 10 is a schematic view of the prior art of FIG. 7 and showing the fuel tank after the fuel supply thereto.

Referring now to FIG. 10, the refueling vapor control valve 26 and the solenoid valve 50 are shown closed after fuel supply to the tank 16. In addition, the pressure control valve 52 retains the internal pressure of the tank 16.

Figure 11:
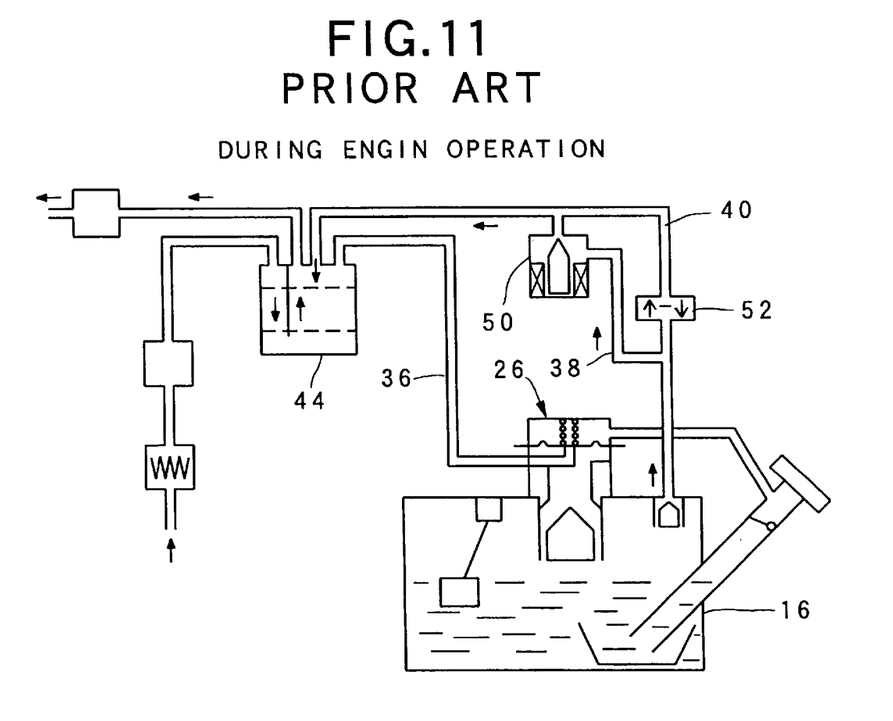
FIG. 11 is a schematic view of the prior art of FIG. 7 and showing the fuel tank during operation of the engine.

Referring to FIG. 11, the refueling vapor control valve 26 and the pressure control valve 52 are closed during operation of the engine 2. However, the solenoid valve 50 is opened, and the evaporated fuel in the fuel tank 16 passes through the second evaporation passage 38 and a portion of the third evaporation passage 40 and is absorbed by the canister 44.

Figure 12:
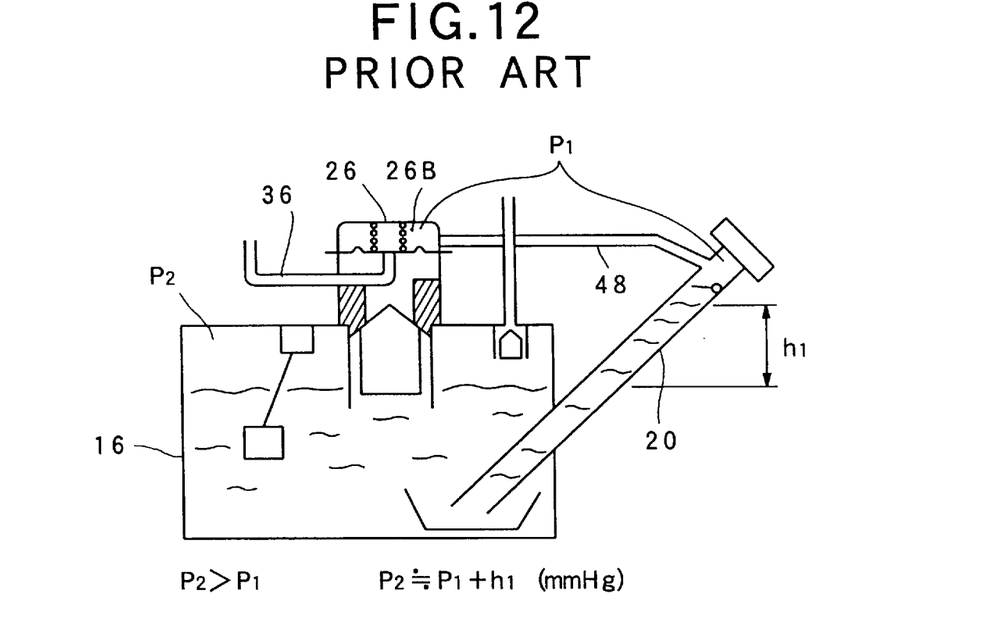
FIG. 12 is a schematic view of the prior art of FIG. 7 and showing the fuel tank when the tank is filled up with fuel immediately after the fuel supply thereto.

As illustrated in FIG. 12, when the tank 16 is filled up with fuel immediately after the supply of fuel thereto, then pressure P1 in the first chamber of the refueling vapor control valve 26 and pressure P2 in the fuel tank 16 are related as:

P2>P1

Assuming that a difference between the fuel level in the fuel-feeding pipe 20 and the fuel level in the fuel tank 16 is h1 (mmHg), then difference h1 (mmHg) added to pressure P1 is substantially equal to pressure P2.

Figure 13:
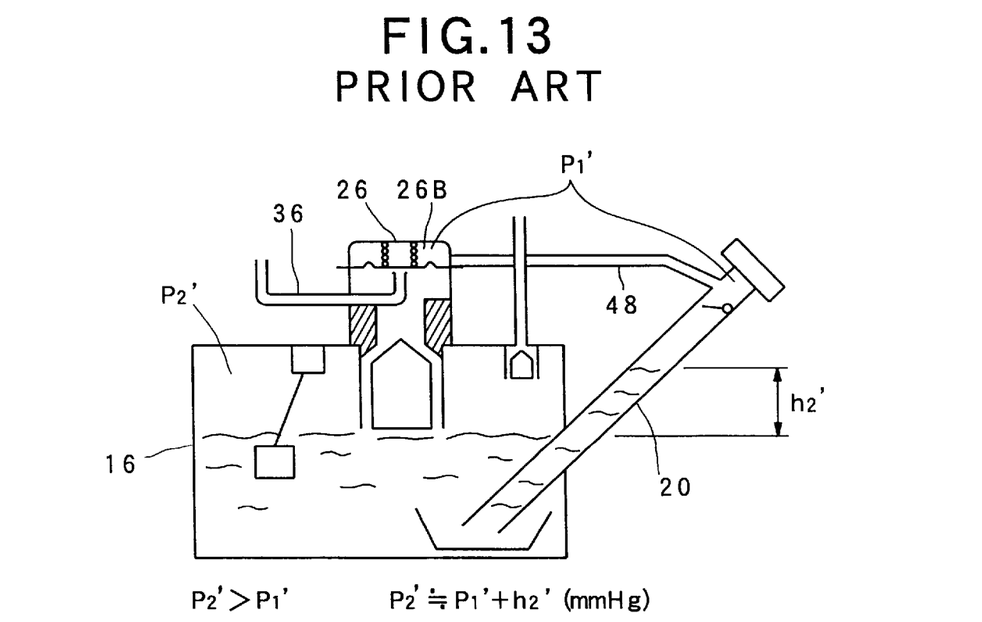
FIG. 13 is a schematic view of the prior art of FIG. 7 and illustrating the fuel tank during running of a vehicle after the fuel tank is filled up with fuel.

Turning now to FIG. 13, the refueling vapor control valve 26 is illustrated opened during running of a vehicle after the fuel tank 16 is filled up with fuel. In addition, the canister (not shown) and the inside of the fuel tank 16 are communicated with one another through the first evaporation passage 36. Then, a relationship between pressure P1' in the first chamber of the refueling vapor control valve 26 and pressure P2' in the fuel tank 16 are described as:

P2'>P1'

Assuming that a difference between one fuel level in the fuel-feeding pipe 20 and another in the fuel tank 16 is h2' (mmHg), then difference h2' (mmHg) added to pressure P1' is substantially equal to pressure P2'.

In conclusion, there occurs a pressure differential between the pressure in the first chamber 26B of the refueling vapor control valve and the pressure in the fuel tank 16. When the pressure differential overcomes the urging force of the refueling vapor control valve, then fuel and/or evaporated fuel in the fuel tank is caused to flow into the canister 44 during deactivation and activation of the engine. This causes inconveniences in that the fuel/evaporated fuel deteriorates the canister, thereby failing to insure canister performance, with a consequential increase in evaporative emissions.

SUMMARY OF THE INVENTION

To obviate the above-mentioned inconveniences, the present invention provides an improved evaporative fuel controller for an improved internal combustion engine having a canister disposed between an evaporation passage communicating with the inside of a fuel tank and a purge passage communicating with an intake passage of an intake system of the engine. The canister absorbingly retains evaporated fuel during shutdown of the engine, which evaporated fuel is generated in the fuel tank and then introduced into the evaporation passage. The absorbingly retained fuel is released from the canister during operation of the engine by way of ambient air introduced through an atmosphere communication passage, with the result that such released fuel is supplied to the intake passage through the purge passage. A purge valve provided substantially midway along the purge passage regulates the amount of the evaporated fuel in accordance with a running state of the engine, the evaporated fuel being fed into the intake passage. A float valve is positioned in the fuel tank, being moved upward and downward in the fuel tank, depending upon the fuel quantity in the fuel tank, thereby opening and closing the evaporation passage. An internal tank pressure control valve opens the evaporation passage when a working pressure from the fuel tank exceeds a predetermined pressure. A refueling vapor control valve is disposed in the fuel tank. The vapor control valve includes first and second chambers in which the first chamber is partitioned and defined by a diaphragm so as to be communicated to a fuel-feeding pipe of the fuel-feeding pipe, while the second chamber is partitioned and defined by the diaphragm so as to be communicated to both the canister and the fuel tank. A communication passage communicates between the first chamber and the canister, and a check valve is positioned substantially midway along the communication passage.

In the present invention, the check valve is disposed substantially midway along the communication passage. The communication passage intercommunicates the first chamber of the refueling vapor control valve and the canister, and closes the refueling vapor control valve during stopping and operation of the engine, except during the feeding of fuel into the fuel tank. This feature eliminates the possibility of fuel and/or evaporated fuel in the fuel tank being caused to flow into the canister. The canister can be prevented from being impaired, which would otherwise result from the aforesaid fuel and/or evaporated fuel, and as a result canister capabilities are ensured.

DETAILED DESCRIPTION

FIGS. 1–6 illustrate the invention wherein reference "A" is added to reference numerals for features identical in function to those described in the prior art of FIGS. 7–13. Reference "A" is also added to new reference numerals.

As illustrated in FIGS. 1–6, a fuel tank 16A in a vehicle (not shown) has a fuel-feeding pipe (filler hose) 20A incorporated therein. A fuel-feeding cap 18A is positioned on the pipe 20A. The pipe 20A has a fuel-feeding passage (filler passage) 22A formed therethrough.

Figure 1:
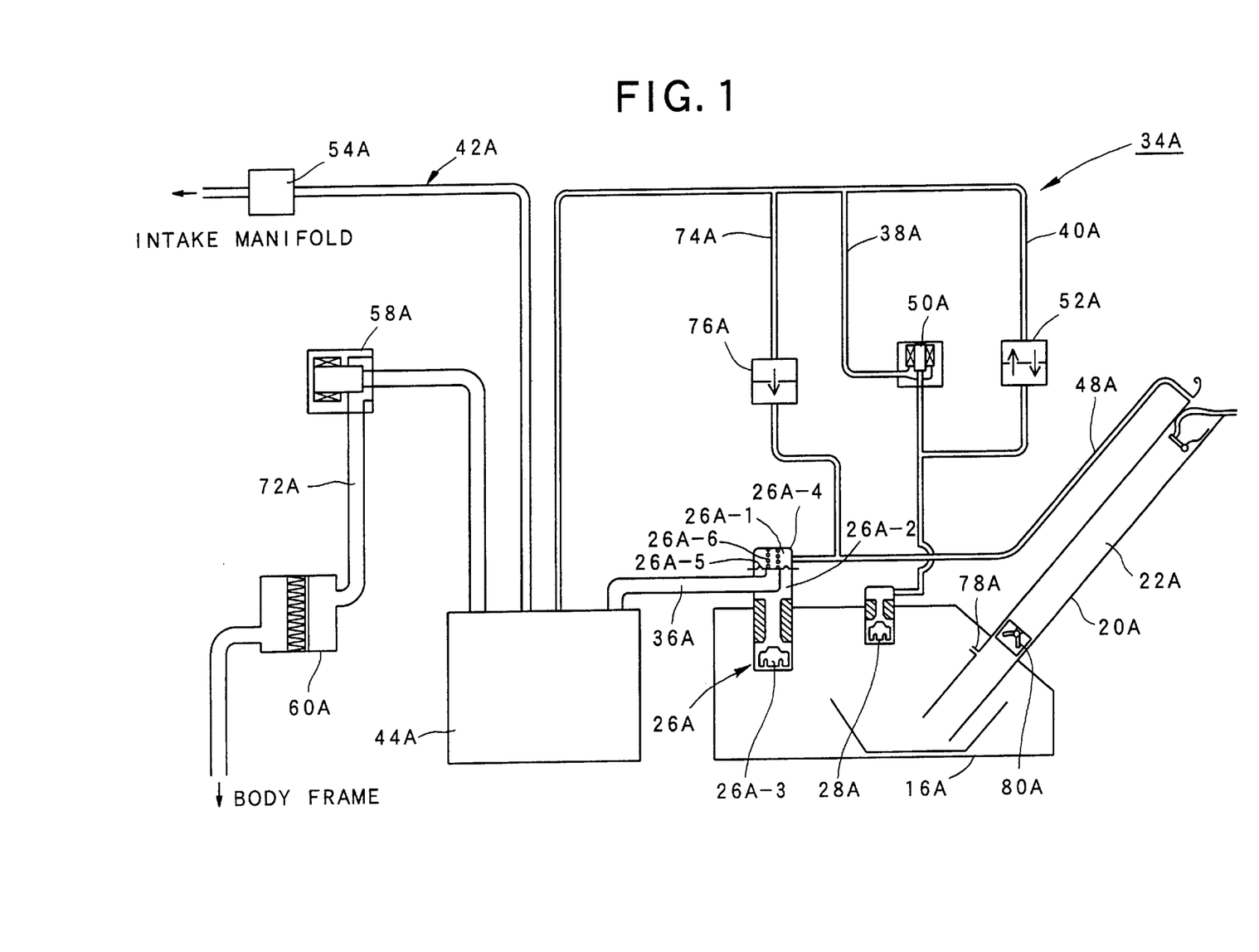
FIG. 1 is a diagrammatic view illustrating an evaporative fuel controller for an internal combustion engine pursuant to an embodiment of the present invention.

The fuel tank 16A has the following provided therein: a fuel pump (not shown); a tank pressure sensor (not shown); a refueling vapor control valve 26A and a float valve 28A, in which the control valve 26A includes the hereinafter mentioned float valve body 26A-3 which is moved upward and downward, depending upon fuel quantity; and, a level gauge (not shown) for detecting the fuel quantity.

A positive pressure type of evaporative fuel controller (evaporation system) 34A is provided between the fuel tank 16A and an intake system of an internal combustion engine (not shown).

In the evaporative fuel controller 34A, an end of first to third evaporation passages 36A, 38A, and 40A communicate with the inside of the fuel tank 16A and one end of purge passage 42A communicates with a surge tank (not shown) which constitutes an intake passage (not shown). Further, a canister 44A is connected between the other ends of the aforesaid evaporation passages 36A, 38A, 40A and the other end of the purge passage 42A.

More specifically, one end of the first evaporation passage 36A is in communication with a second chamber 26A-2 of the refueling vapor control valve 26A toward the fuel tank 16A. One end of the second evaporation passage 38A is in communication with the third evaporation passage 40A at a location substantially midway therealong.

In the fuel tank 16A, one end of the third evaporation passage 40A is positioned within a float guide body (not shown) at a location spaced apart from the top of the fuel tank 16A by a predetermined distance so as to be opened and closed by the float valve 28A. The float valve 28A is guided by the float guide body so as to be movable upward and downward therein.

In the tank 16A, there exists a gap between one end of the first and third evaporation passages 36A and 40A.

The other end of the first evaporation passage 36A is in communication with the top of the canister 44A. The other end of the second evaporation passage 38A is in communication with the third evaporation passage 40A at a location substantially midway therealong. The other end of the third evaporation passage 40A is in communication with the top of the canister 44A.

The refueling vapor control valve 26A is provided with the float valve body 26A-3, a first chamber 26A-1, and the second chamber 26A-2. The first and second chambers 26A-1 and 26A-2 are a pressure-working chamber and a passage communication chamber, respectively, both of which chambers are partitioned and formed within a housing 26A-4 by means of a partition or diaphragm 26A-5. In addition, the first chamber 26A-1 has a spring 26A-6 provided therein for pressing the diaphragm 26A-5. Further, a valve seat body (not shown) is provided for causing the first evaporation passage 36A to be opened and closed by a central portion of the diaphragm 26A-5 being brought into contact with and away from the valve seat body in the second chamber 26A-2.

More specifically, the refueling vapor control valve 26A includes the first and second chambers 26A-1 and 26A-2 in which the former chamber 26A-1 is partitioned and defined by the diaphragm 26A-5 so as to be in communication with the fuel-feeding pipe (filler hose) 20A adjacent to the fueling end of the pipe 20A. The second chamber 26A-2 is partitioned and formed by the diaphragm 26A-5 so as to be in communication with both the canister 44A and the fuel tank 16A.

The first chamber 26A-1 and the fuel-feeding passage 22A are in communication with one another through a tank-side communication passage 48A. In this connection, 50A denotes a solenoid valve; 52A a pressure control valve; 54A a purge valve (solenoid valve); 58A an air-cut valve (solenoid valve); 60A an air cleaner; and, 72A an atmosphere communication passage.

A communication passage 74A is provided for communicating the first chamber 26A-1 and the canister 44A together. A check valve 76A is provided substantially midway along the communication passage 74A.

In greater detail, as illustrated in FIG. 1, in order to eliminate a pressure differential between the first chamber 26A-1 and the fuel-feeding pipe 20A adjacent to the fueling end of the pipe 20A during stopping and operation of the engine after the supply of fuel thereto, then one end of the communication passage 74A is provided in communication with the tank-side communication passage 48A at a location substantially midway therealong. The tank-side communication passage 48A intercommunicates the first chamber 26A-1 and the fuel-feeding pipe 20A adjacent to the fueling end of the pipe 20A. The other end of the communication passage 74A is positioned in communication with the third evaporation passage 40A at a location between the canister 44A and the location where the second and third evaporation passages 38A and 40A communicate with one another. The check valve 76A, formed by an one-way valve, is disposed along the communication passage 74A.

When a pressure inside the fuel tank 16A rises during shutdown of the engine, then the check valve 76A holds the pressure inside the tank 16A to a predetermined pressure level in order to prevent evaporated fuel from flowing into the canister 44A.

Further, the check valve 76A causes evaporated fuel in the fuel-feeding passage 22A near the fueling end of the pipe 20A to flow into the canister 44A during fuel supply to the tank 16A in order to prevent the evaporated fuel from being discharged into the atmosphere through the fueling end of the pipe 20A.

Yet further, a valve (not shown) for detecting a fuel-feeding nozzle (not shown), which is intended for either unleaded or leaded gasoline, is provided inside the fuel-feeding pipe (filler hose) 20A near the fuel-feeding cap 18A.

In this connection, reference 78A denotes an orifice for backing up the check valve 76A, while reference 80A designates a check valve.

Next, the operation of the present embodiment will be described.

Figure 2:
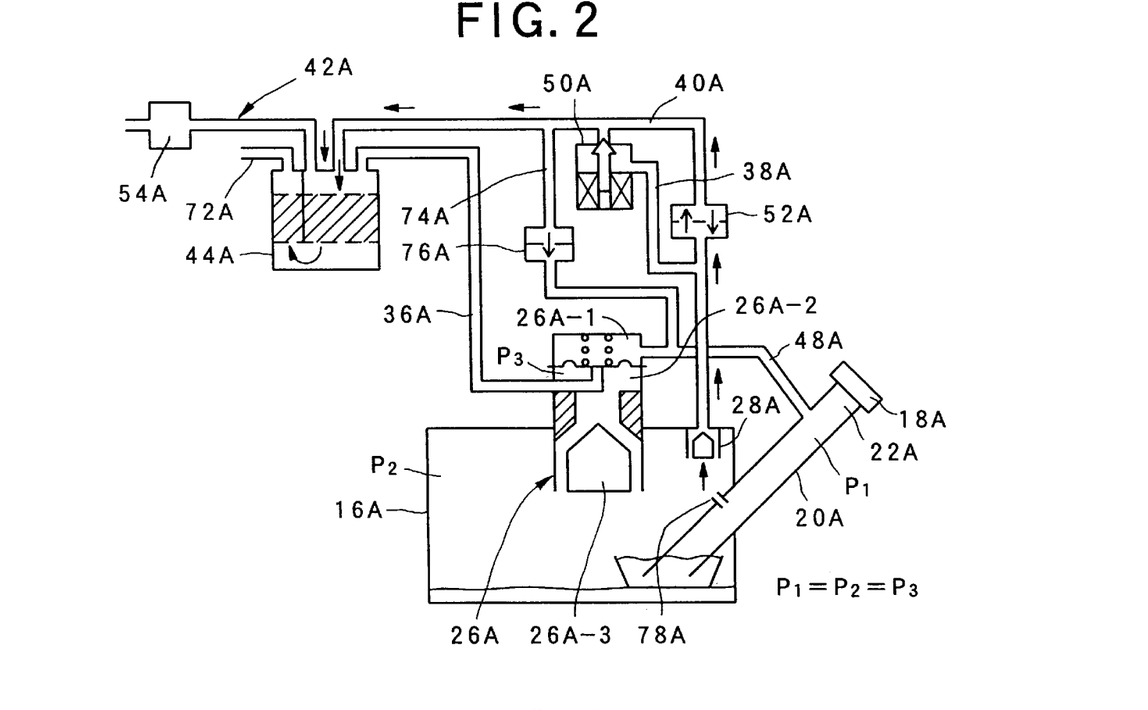
FIG. 2 is a schematic view, showing a fuel tank during stopping of the engine and before fuel supply to the fuel tank.

Referring to FIG. 2, the refueling vapor control valve 26A and the solenoid valve 50A are shown closed during shutdown of the engine and before fuel supply to the fuel tank 16A. Then, evaporated fuel inside the tank 16A is brought to the pressure control valve 52A through the float valve 28A in its open position. The pressure control valve 52A retains the internal tank pressure of the fuel tank 16A, while an excess of the internal tank pressure is caused to flow to the canister 44A through the pressure control valve 52A.

Figure 3:
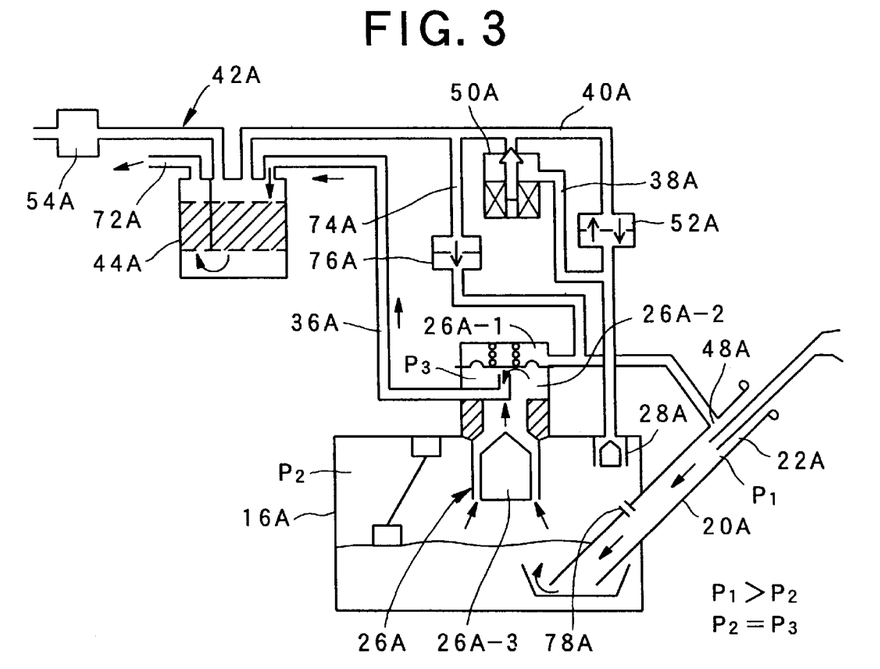
FIG. 3 is a schematic view, showing the fuel tank during stopping of the engine and during fuel supply thereto.

As illustrated in FIG. 3, the relationship between pressure P1 in the first chamber 26A-1 of the control valve 26A and pressure P2 in the fuel tank 16A during the supply of fuel to the fuel tank 16A is described as:

P2>P1 where pressure P1 is equal to atmospheric pressure, and pressure P2 amounts to some 50–300 mmHg. Thus, the refueling vapor control valve 26A is opened, and the evaporated fuel in the tank 16A is absorbed by the canister 44A through the first evaporation passage 36A.

Figure 4:
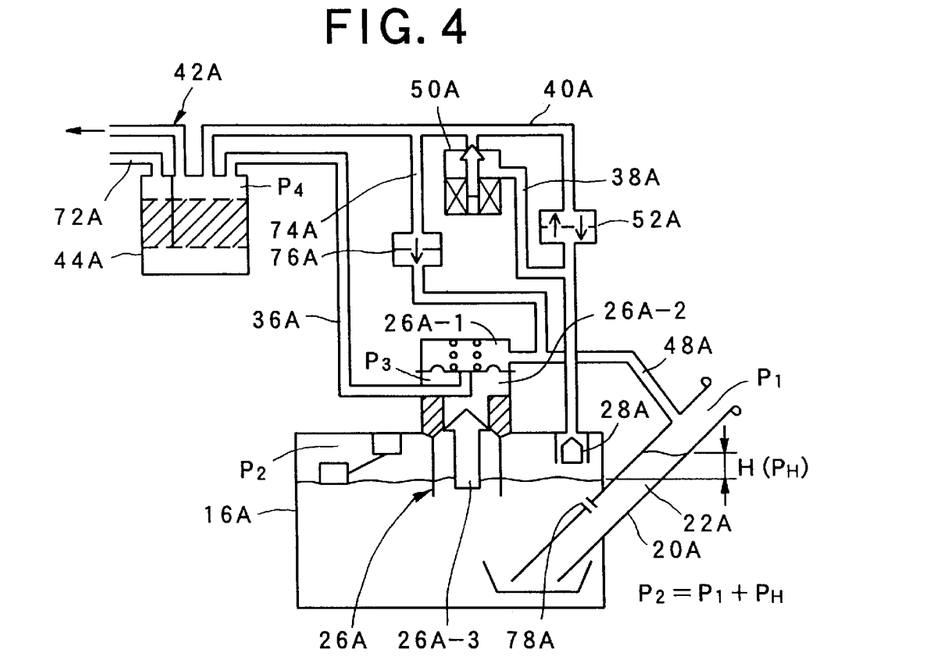
FIG. 4 is a schematic view, illustrating the fuel tank immediately after the supply of fuel thereto and during shutdown of the engine.

Turning now to FIG. 4, pressures P1 and P2 immediately after fuel supply to the tank 16A and during shutdown of the engine are still related as:

P2>P1 with P1 still being atmospheric pressure.

However, when attention is directed to high-low pressure $P_H$ reflected by elevation difference H between one fuel level in the fuel-feeding pipe 20A and the fuel level in the tank 16A, then the following relationship is established:

$P2=P1+P_H$

Thus, the refueling vapor control valve 26A remains closed.

Figure 5:
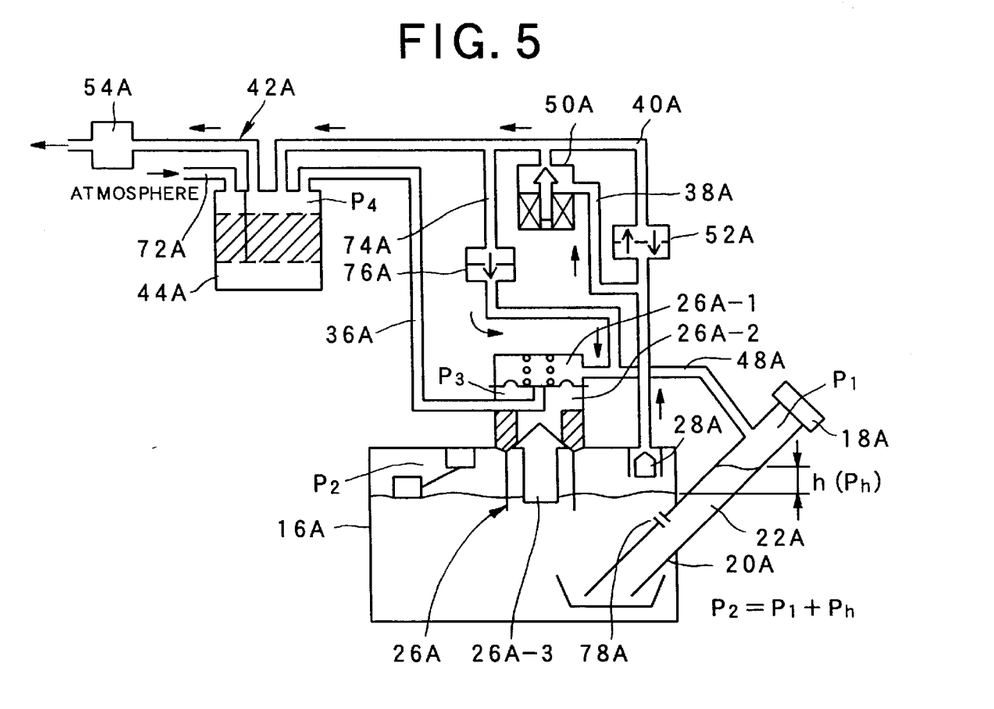
FIG. 5 is a schematic view, illustrating the fuel tank immediately after the supply of fuel thereto and during operation of the engine.

Since the solenoid valve 50A is opened immediately after fuel supply to the tank 16A and during operation of the engine (FIG. 5), the pressure on the canister 44A, which pressure is substantially equal to atmospheric pressure, opens the check valve 76A, and then acts on the refueling vapor control valve 26A. As a result, the pressure P2 in the tank 16A reaches atmospheric pressure. This means that the following relationship is established:

$P2=P1+P_h$

In this case (FIG. 5), when pressure P2 in the tank 16A approaches the atmospheric pressure, then pressure P1 in the first chamber 26A-1 is varied as well because the fuel-feeding cap 18A encloses and secures the fuel-feeding pipe 20A. Then, pressure P1 is turned to be a negative pressure. More specifically, pressure differential ΔP between pressures P1 and P2 is varied to a level similar to that shown in FIG. 4.

Figure 6:
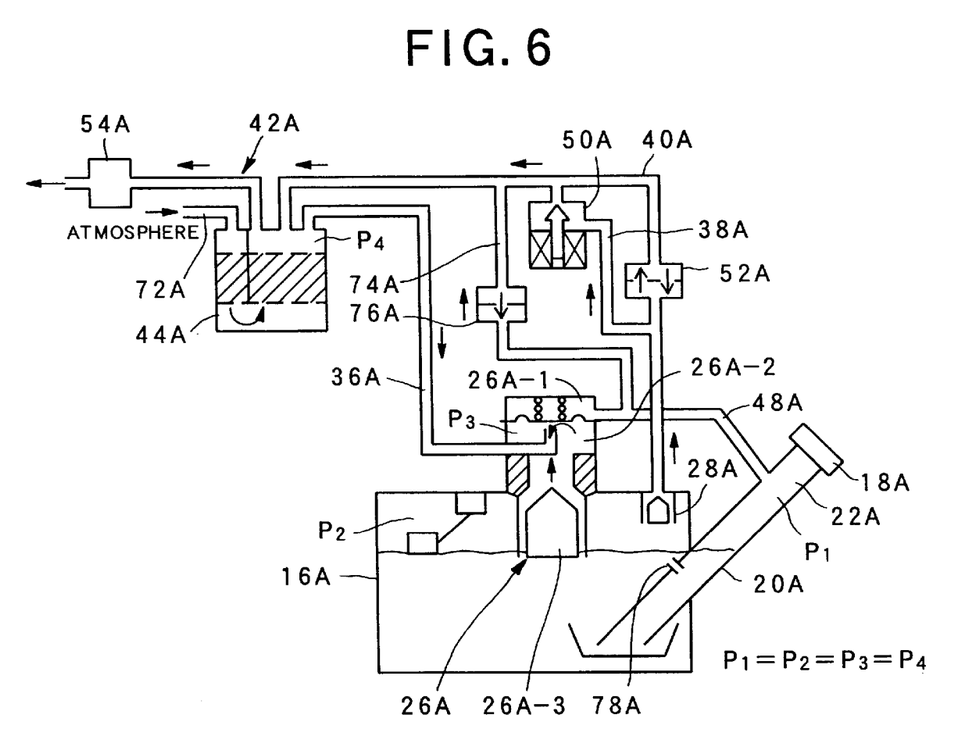
FIG. 6 is a further schematic view, showing the fuel tank during operation of the engine.

However, since the check valve 76A is disposed substantially midway along the communication passage 74A which is associated with pressure P1 in the first chamber 26A-1, pressure P1 is influenced so as to substantially achieve the atmospheric pressure, rather than being at a negative pressure. This means that pressure P1 in the chamber 26A-1 and pressure P2 in the tank 16A achieve a substantially equal pressure level. Such a state is seen when the engine is in operation as illustrated in FIG. 6.

The orifice 78A functions to bring pressures P1 and P2 to a substantially equal pressure level. However, the orifice 78A is rendered inoperative until the moment when the fuel level is lowered to a point where the orifice 78A is positioned above the fuel level as a result of a certain amount of fuel being consumed by running of the engine. This is because the orifice 78A is positioned so as to lie within the fuel level in the tank 16A in order to avoid increasing fueling emissions when the tank 16A is full of fuel, i.e., when the tank 16A is filled up with fuel. Accordingly, the orifice 78A serves solely as a backup or follower for the check valve 76A.

In conclusion, the check valve 76A is disposed substantially midway along the communication passage 74A. This passage 74A communicates the first chamber 26A-1 and the canister 44A together and closes the refueling vapor control valve 26A during deactivation and activation of the engine except for the feeding of fuel into the fuel tank 16A. This structure obviates the likelihood that fuel and/or evaporated fuel inside the fuel tank 16A is caused to flow into the canister 44A. As a result, the canister 44A can be prevented from being deteriorated, which would otherwise result from the aforesaid fuel and/or evaporated fuel. Thus, canister functionality can be ensured.

When the pressure inside the fuel tank 16A rises during shutdown of the engine, then the check valve 76A can retain the pressure inside the tank 16A to a predetermined level. Thus, it is possible to reliably prevent the evaporated fuel from flowing into the canister 44A, which prevents the impairment of the canister 44A.

The check valve 76A allows the evaporated fuel in the fuel-feeding passage 22A near the fueling end of the fuel-feeding pipe 20A to flow into the canister 44A during fuel supply to the fuel tank 16A. As a result, the evaporated fuel can be prevented from being vented to the atmosphere through the fueling end of the fuel-feeding pipe 20A. This is advantageous in view of practical use.

It is to be noted that the present invention is not limited to the above-described embodiment, but is susceptible to various changes and modifications.

For example, pursuant to the present embodiment, the check valve provided substantially midway along the communication passage is described as a one-way valve, which communication passage communicates the first chamber of the refueling vapor control valve with the canister. Aside therefrom, however, the check valve may be a two-way valve as well.

In the present invention, there is provided an evaporative fuel controller for an internal combustion engine. It has a canister disposed between an evaporation passage communicated to the inside of a fuel tank and a purge passage communicated to an intake passage of an intake system of the engine. The canister absorbingly retains evaporated fuel during shutdown of the engine. The evaporated fuel is generated in the fuel tank and then introduced into the evaporation passage. The absorbingly retained fuel is released from the canister during operation of the engine by way of ambient air introduced through an atmosphere communication passage. The result is that such released fuel is supplied to the intake passage through the purge passage. A purge valve is provided substantially midway along the purge passage for regulating an amount of the evaporated fuel in accordance with a running state of the engine. The evaporated fuel is fed into the intake passage. A float valve is positioned in the fuel tank, the float valve being moved upward and downward in the fuel tank, depending upon fuel quantity in the fuel tank. This opens and closes the evaporation passage, and an internal tank pressure control valve for opening the evaporation passage when a working pressure from the fuel tank exceeds a predetermined pressure. A refueling vapor control valve is disposed in the fuel tank. The control valve includes first and second chambers in which the first chamber is partitioned and defined by a diaphragm so as to be communicated to a fuel-feeding pipe in the fuel tank adjacent to the fueling end of the fuel-feeding pipe. The second chamber is partitioned and defined by the diaphragm so as to be communicated to both the canister and the fuel tank. A communication passage communicates between the first chamber and the canister. A check valve is positioned substantially midway along the communication passage. As a result, the check valve disposed substantially midway along the communication passage, which passage intercommunicates the first chamber of the refueling vapor control valve and the canister, closes the refueling vapor control valve during stopping and operation of the engine, except during fuel supply to the fuel tank. This feature eliminates the possibility of fuel and/or evaporated fuel in the fuel tank flowing into the canister. Thus, the canister can be prevented from being impaired, which would otherwise result from the aforesaid fuel and/or evaporated fuel. Canister performance can thus be ensured.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In an evaporative fuel controller for an internal combustion engine, having a canister disposed between an evaporation passage communicating with the inside of a fuel tank and a purge passage communicating with an intake passage of an intake system of said engine, in which said canister absorbingly retains evaporated fuel during shutdown of said engine, the evaporated fuel being generated in said fuel tank and then introduced into said evaporation passage, and from which the absorbingly retained fuel being liberated during operation of said engine through the aid of ambient air introduced through an atmosphere communication passage, so that such released fuel is supplied to said intake passage through said purge passage, a purge valve provided along said purge passage for regulating an amount of the evaporated fuel in accordance with a running state of said engine, the evaporated fuel being fed into said intake passage, a float valve disposed in said fuel tank, said float valve being moved upward and downward in said fuel tank depending upon fuel quantity in said fuel tank, thereby opening and closing said evaporation passage, and an internal tank pressure control valve for opening said evaporation passage when a working pressure from said fuel tank exceeds a predetermined pressure, the improvement comprising: a refueling vapor control valve disposed in said fuel tank, said control valve including first and second chambers in which said first chamber is partitioned and defined by a diaphragm so as to be in communication with a fuel-feeding pipe in said fuel tank adjacent to a fueling end of said fuel-feeding pipe, while said second chamber is partitioned and defined by said diaphragm so as to be in communication with both of said canister and said fuel tank; a communication passage for providing communication between said first chamber and said canister; and, a check valve positioned along said communication passage.

2. An evaporative fuel controller as defined in claim 1, wherein said check valve is disposed along said communication passage that is in communication with a tank-side communication passage, said tank-side communication passage intercommunicating said first chamber and said fuel-feeding pipe adjacent to the fueling end of said pipe in order to eliminate a pressure differential between said first chamber and said fuel-feeding pipe adjacent to the fueling end of said pipe during stopping and operation of said engine after fuel supply to said fuel tank.

3. An evaporative fuel controller as defined in claim 1, wherein said check valve holds a pressure inside said fuel tank to a predetermined pressure level in order to prevent evaporated fuel from flowing into said canister when the pressure inside said fuel tank rises during shutdown of said engine.

4. An evaporative fuel controller as defined in claim 1, wherein said check valve is disposed along said communication passage that is communicated to a tank-side communication passage, said tank-side communication passage intercommunicating said first chamber and said fuel-feeding pipe adjacent to the fueling end of said pipe, and wherein said check valve causes evaporated fuel in said fuel-feeding pipe adjacent to the fueling end of said pipe to flow into said canister during fuel supply to said fuel tank in order to prevent the evaporated fuel from being discharged into the atmosphere through the fueling end of said pipe.

* * * * *